United States Patent [19]

Murakoshi

[11] Patent Number: 4,531,161
[45] Date of Patent: Jul. 23, 1985

[54] SOUND RECORDING SYSTEM FOR ELECTRONIC STILL CAMERA

[75] Inventor: Makoto Murakoshi, Tokyo, Japan

[73] Assignee: Fuji Photo Film Co., Ltd., Kanagawa, Japan

[21] Appl. No.: 494,898

[22] Filed: May 16, 1983

[30] Foreign Application Priority Data

Jun. 10, 1982 [JP] Japan .................................. 57-99699

[51] Int. Cl.³ .......................................... H04N 5/781
[52] U.S. Cl. .................... 360/10.1; 358/341; 358/906; 360/5; 360/19.1; 360/35.1
[58] Field of Search ............... 358/341, 906; 360/10.1, 360/5, 19.1, 35.1

[56] References Cited

U.S. PATENT DOCUMENTS 3,919,716 11/1975 Yumde ........................... 360/35.1 X
4,065,795 12/1977 Shutterly ............................. 360/35.1
4,456,931 6/1984 Toyoda et al. .................. 358/906 X Primary Examiner—Robert L. Richardson
Attorney, Agent, or Firm—Birch, Stewart, Kolasch & Birch

[57] ABSTRACT

Sound associated with a scene which a still camera shot is picked up over a desired period of time starting from the instant which is a given time before the instant of depression of a release button of the camera. A shift register serves as a delay element for delaying an input time-serial digitized audio signal by the desired period of time, before the audio signal is written into an audio track of a magnetic disc which also has a video track for storing a video signal associated with the audio signal. During reproduction, one may hear the sound through a loudspeaker while watching the still picture displayed on a CRT or the like. The same sound may be reproduced repeatedly over a desired period of time.

16 Claims, 2 Drawing Figures

SOUND RECORDING SYSTEM FOR ELECTRONIC STILL CAMERA

BACKGROUND OF THE INVENTION

1. Field of the Invention

The present invention relates to a sound recording system and, more particularly, to one for use with an electronic still camera.

2. Description of the Prior Art

Recently, an electronic still camera has been developed which employs a charge coupled device (CCD) or like solid-state image pickup device and a magnetic disc or like small-sized magnetic storage medium in combination. An image picked up by the still camera of the type described is written into the magnetic medium in the form of video signals which well adapt themselves to a television system. This kind of image, therefore, is suitable for being displayed as a still picture on a soft copy display device or processed into a hard copy by an image recording device such as an ink jet printer or a laser beam electrophotographic recorder.

While reproducing an image in the form of a soft copy or a hard copy, one may desire to hear sound associated with the scene such as a narration or a piece of music. One may further desire to shoot a scene while picking up sound occurring therearound and reproduce the sound together with the scene. This demand, however, encounters a conflict that while a shot of a scene is instantaneous, sound associated with the shot has a time axis which must be reproduced dynamically in the event of reproduction.

Narration or music associated with a still picture may be simply postrecorded to have correspondence with a video signal which represents the still picture. A problem, however, exists in recording sound emitted in a scene from the standpoint of its correspondence with the scene. For example, if the recording system is automatically triggered by the depression of a release button of the camera, sound cannot be recorded except for a period after the shot. Recording sound before and after a shot will naturally furnish the resulting picture with greater realism at the time of reproduction. However, because the depression of the release button is not of the scheduled nature at all, sound before and after a shot cannot be picked up unless the device is constantly kept in operation. This not only consumes the recording medium more than necessary but obliges one to carry out troublesome work for editing the used recording medium to provide it correspondence with the successive pictures.

SUMMARY OF THE INVENTION

It is therefore an object of the present invention to provide a sound recording system for an electronic still camera which is capable of recording sound over a certain period of time inclusive of the instant of a shot.

A sound recording method embodying the present invention is applicable to an electronic still camera which records video signals indicative of still images time-serially on a recording medium. The method comprises the steps of constantly delaying sequentially input, time-serial audio signals by a predetermined period of time, and sequentially recording the delayed audio signal on the recording medium in response to a shot, whereby sound is recorded on the recording medium starting from the instant which is precedent to the instant of the shot by the predetermined period of time.

Such a sound recording method may be practiced with a sound recording apparatus for an electronic still camera which records video signals indicative of still images time-serially on a recording medium, comprising a delay circuit for delaying input audio signals thereof each by a predetermined period of time, sound recording means for recording an output of the delay circuit in the recording medium, and a control circuit for supplying the sound recording means with an output of the delay circuit in response to a shot, whereby sound is recorded on the recording medium starting from the instant which is precedent to the instant of the shot by the predetermined period of time.

The sound recording method may also be practiced with a sound reproducing apparatus for an electronic still camera for reproducing, together with a video signal indicative of a still image, an audio signal which is recorded on a rotary recording medium in correspondence with the video signal, comprising drive means for driving the rotary recording medium at a predetermined rotation speed which is suitable for the reproduction of the still image, reading means for reading out of the rotary recording medium an audio signal associated with a video signal which is reproduced from the recording medium, storage means for temporarily storing a unit recording amount of the audio signal read out from the recording medium by the reading means, reproducing means for reproducing as audible sound the audio signal output from the storage means, and a control circuit for causing an audio signal to be read out of the storage means at a rate suitable for audio signal reproduction in response to the audio signal being stored in the storage means, whereby sound associated with a still image which is in reproduction is reproduced from the reproducing means.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENTS

Figure 1:
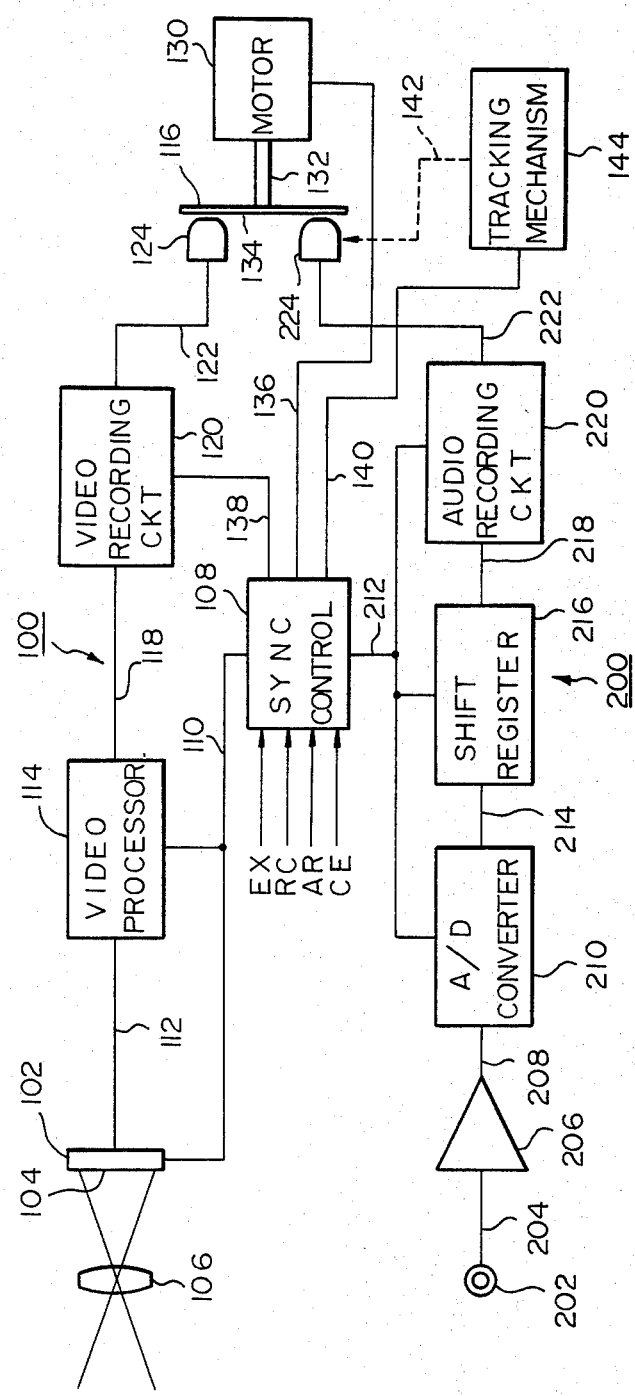
FIG. 1 is a schematic block diagram of an image and sound recording circuitry for realizing a sound recording system in accordance with the present invention.

Referring to FIG. 1 of the drawings, there is shown an image and sound recording circuit for realizing the sound recording system of the present invention. The circuitry generally comprises a video section 100 and an audio section 200. The video section 100 includes a solid-state image pickup device or imager 102 which may typically be a charge coupled device (CCD). The image of an object is focused by a lens 106 onto the imaging surface or photosensitive sensor array 104 of the imager 102. A time-serial video signal representing the focused image is developed on an output 112 of the imager 102 clocked with an output signal of a synchronous control 108 on a lead 110.

The output 112 of the imager 102 is connected to a video processing circuit 114 which processes the video signal provided on the lead 112 to give it a predetermined mode and format to be recorded on a magnetic video disc 116, which will be described. The output 118 of the video processor 114 is connected to a video recording circuit 120 which modulates and amplifies the video signal supplied on the lead 118 to drive a magnetic video write head or transducer 124, which is connected to the output 122 of the video recording circuit 120.

The audio section 200, on the other hand, includes a microphone 202 which is adapted to pick up sound during a shot or to postrecord narration as desired. The output 204 of the microphone 202 is connected via an amplifier 206 to an analog-to-digital (A/D) converter 210. Clocked with an output signal of the sync control 108 on a lead 212, the A/D converter 210 samples and quantizes the audio signal at an input 208 to prepare, for example, an eight-bit word companded into 256 steps. The eight-bit word is produced on an output 214.

The output 214 of the A/D converter 210 is connected to a shift register 216 which is clocked by the sync control 108 and time-serially supplied by the A/D converter 210 with digital audio signals. Thus, the shift register 216 functions as a delay circuit which delays each input video signal by a predetermined period of time, e.g. four seconds. The sequential output of the shift register 216 appears on an output line 218.

In the illustrated embodiment, the sync control 108 supplies the shift register 216 with two different clocks, i.e. 128 kHz clock and 16 kHz clock. While the 128 kHz clock is the write clock for causing the sampled eight-bit audio signal to be written into the shift register 216, the 16 kHz clock is the read clock for causing the audio signal to be read out of the shift register 216 in the manner described and to be recorded on a track of the disc 116. The operating speed of the disc 116 is 3,600 rpm in the illustrative embodiment. It will be seen that the frequency of the read clock may be 1.2 MHz in case where, for example, five shift registers 216 are arranged in parallel to record data on five tracks of the disc 116 in parallel.

The shift register 216 may advantageously be constituted by an ordinary dynamic random access memory (DRAM). If desired, the shift register 216 may be replaced by a magnetic disc which rotates at a predetermined speed. Then, a magnetic write head will be connected to the input 214 and a magnetic read head to the output 218, so that a predetermined delay may develop before the read head reads out the audio signal written into the disc by the write head after the start of rotation of the disc. Concerning DRAM, for example, it requires a storage capacity of 512K bits on the assumption that a delay of four seconds is effected on an audio signal which has been prepared by sampling an 8 kHz audio frequency at a sampling rate of 16 kHz and digitizing it with respect to eight-bit quantizing levels. Such shift registers and DRAMs will be generally termed as a first-in-first-out, FIFO, circuit hereinafter.

Connected to the output 218 of the shift register 216 is an audio recording circuit 220 which has an output 222 connected to a magnetic audio write head or transducer 224. The recording circuit 220 serves to modulate and amplify the output of the shift register 216 to drive the head 224 with an output thereof. A digital-to-analog (D/A) converter may be furnished with in the recording circuit 220 in order to deliver the analog version of the digital audio signal at the input 218 to the output 222, thereby recording sound in the form of analog signals.

The disc 116 resembles a floppy disc and comprises a circular magnetic medium whose innermost diameter is about 32 mm. The disc 116 is detachably mounted on an output shaft 132 of a motor 130. The magnetic heads 124 and 224 are arranged on the recording surface 134 of the disc 116 (one or both surfaces). As symbolically indicated by a phantom line 142, a tracking mechanism 144(including a track sensor mechanism and a head transport mechanism) moves the heads 124 and 224 over the recording surface 134 in the radial direction of the disc 116, so that a desired track may be selected and traced by the heads 124 and 224. It will be noted that an optical disc is usable in place of the magnetic disc 116 so as to record image and sound by means of a laser beam.

The motor 130 is driven by pulses supplied from the sync control 108 on a lead 136 and, in turn, drives the disc 116 for rotation at a predetermined speed such as 3,600 rpm. The recording surface 134 of the disc 116 has thereon a plurality of video tracks and a plurality of audio tracks. Each video track accommodates a video signal of one field. Concerning the audio tracks, 512K bits are required for sound generated within four seconds as has previously been assumed. Then, in the case of a disc having the innermost diameter of 32 mm and tracks whose record length is 1 micrometer per bit, an audio signal can be recorded 100K bits on each track and, therefore, an audio signal lasting for four seconds on five tracks. Where the audio signal is in the form of an eight-bit word as already described, it may be recorded in parallel in eight audio tracks. In addition, if the recording circuit 220 includes a D/A converter, the audio signal may be written into a single audio track in the analog form.

The sync control 108, as understood from the above, functions to control the video section 100 and audio section 200 by delivering various sync signals thereto.

Initially, the sync control 108 actuates the tracking mechanism 144 so that an empty track on the recording surface 134 of the disc 116 is selected to bring the heads 124 and 224 to the position above the empty track. As soon as a release button (not shown) of the camera is depressed for a shot, a signal EX indicative of the exposure is fed to the sync control 108 which then triggers the imager 102 and image processor 114 via the lead 110 and the video record circuit 120 via the lead 138. This clocks the imager 102 to generate one field of video signal whose duration is 1/60 second. At the same time, the sync control 108 supplies pulses to the motor 130 on the lead 136 whereby the motor 130 is driven to cause the disc 116 into rotation at the speed of 3,600 rpm. As a result, one field of video signal becomes recorded on one video track of the disc 116 when the video track completes one full rotation.

When a record switch adapted to activate the audio circuit 200 is operated prior to the procedure described above, a signal RC indicating it is fed to the sync control 108 so that the write clock whose frequency may be 128 kHz is produced on the lead 212. The analog audio signal coming in through the microphone 202 is amplified by the amplifier 206, converted into an eight-bit audio signal by the A/D converter 210, and then fed to the shift register 216 to be sequentially shifted therethrough. Because the shift register 216 delays the audio signal by four seconds in this embodiment, the audio signal appearing at the output 218 is always the signal which was generated four seconds before. However, this audio signal is not taken into the record circuit 220 at this stage of operation. Therefore, in response to the signal EX, the sync control 108 drives the recording circuit 220 while delivering the 6 MHz read clock to the shift register 216. The four-second delayed digital audio signal appearing at the output 218 is recorded on an audio track the disc 116. Sound may thus be recorded continously on the audio tracks of the disc 116 from the instant four seconds before the depression of the release button.

Here, fixing the time period available for recording sound before a shot, four seconds in this embodiment, is not essential. For example, when the audio signal is to be read out of the shift register 216 timed to the read clock after the depression of the release button, the trigger position with respect to time for recording the signal on the disc 116 via the record circuit 220 may be varied to make the time period concerned controllable over the four seconds at the maximum. To stop the sound recording operation, the record switch is deactuated after the depression of the release button so that the control 108 deenergizes the record circuit 220. Alternatively, a timer circuit may be installed in the sync control 108 in order to automatically terminate the sound pickup operation upon the lapse of a predetermined period of time, e.g., four seconds, after the depression of the release button. Another approach for the automatic stop may be causing the control 108 to sense through the tracking mechanism 144 the fact that sound has filled a predetermined number of tracks on the disc 116.

It is sometimes desired to record video signals of a plurality of fields at a time on the video tracks of the disc 116, i.e., in the consecutive shoot mode. Then, the sync control 108 responds to a consecutive/superpose shoot mode signal CE by recording sound associated with the initial field in the manner described and, thereafter, in an intermittent manner so long as the consecutive shoot mode lasts. The sound pickup will be controlled in the same manner. Likewise, sound associated with the initial shot will be recorded under the superimpose shoot mode. If desired, the sync control 108 may be constructed so that a timer circuit associated therewith starts counting time in response to a signal EX and, when another signal EX has appeared within a predetermined period of time due to a second shot, the sync control 108 determines the system as being under the consecutive or superimpose shoot mode to cause the sound recording operation under way to continue intermittently. If a signal EX appears after the lapse of the predetermined time period, the sync control 108 will start a new sound pickup operation determining the system to be under a single shoot mode.

For postrecording, a postrecord switch (not shown) is operated to deliver a signal AR to the sync control 108 which then drives the audio section 200 to record desired sound. It will be noted that the delay due to the shift register 216 is not essential in this case, and, therefore, a route bypassing the shift register 216 may be set up from the output 214 of the A/D converter 210 to the input 218 of the record circuit 220. The postrecording operation will be terminated when the postrecord switch is deactuated to deenergize the signal AR.

Figure 2:
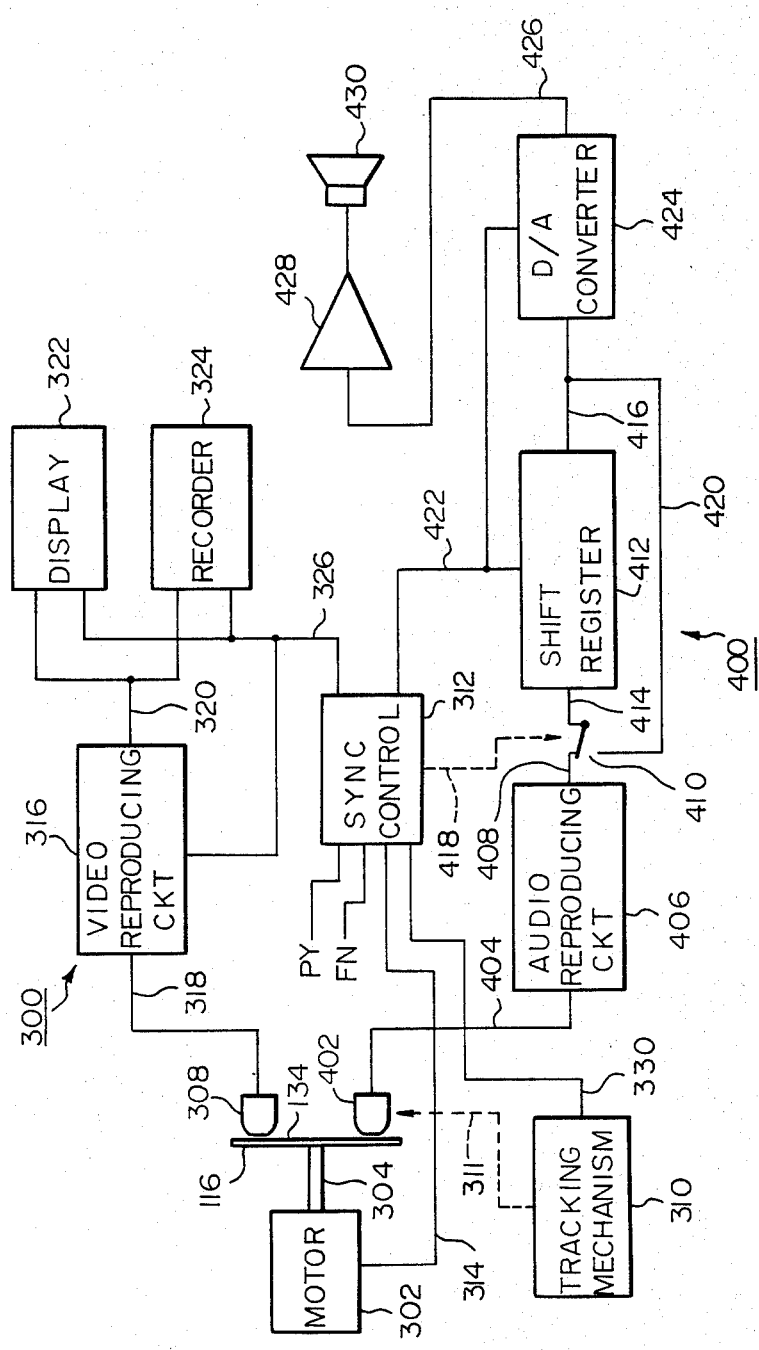
FIG. 2 is a schematic block diagram of an image and sound reproducing circuitry for realising the system of the present invention.

Referring to FIG. 2, an image and sound reproducing circuitry is shown for implementing the sound recording system of the present invention. The reproducing circuitry, like the recording circuitry, comprises a video section 300 and an audio section 400. The disc 116 carrying video and audio signals is detachably mounted on an output shaft 304 of a motor 302. A video read head 306 and an audio read head 402 are located to face the recording surface 134 of the disc 116. The heads 306 and 402 are driven by a tracking mechanism 310 to move radially over the recording surface 134 of the disc 116. The tracking mechanism 310, like the tracking mechanism 144 shown in FIG. 1, detects specific tracks on the disc 116 to transport the heads 306 and 402 therealong.

Again, the motor 302 may comprise a stepping motor which drives the disc 116 at the speed of 3,600 rpm, for example, in response to pulses which are fed thereto from a sync control 312 on a lead 314. Where such a reproducing circuitry is to be combined with the recording circuitry shown in FIG. 1 within a common apparatus, the recording circuitry may share some or all of the motor 302, shaft 304, heads 308 and 402, tracking mechanism 310, sync control 312, etc.

The video section 300 includes a video reproducing circuit 316 having an input 318 which is connected to the video read head 308. The reproducing circuit 316 includes an amplifier, a demodulator, a video processing circuit and a sync extracting circuit. The output 320 of the reproducing circuit 316 is connected to a display 322 and/or a recorder 324. The display 322 may be of the type which includes a cathode ray tube (CRT) to provide a visible soft copy of the video signal, which is read out of the disc 116 to be produced on a line 320. The recorder 324 may comprise an ink jet printer, a laser beam electrophotographic recorder or the like which reproduces the video signal provided on the line 320 as a hard copy.

The audio read head 402 is connected by a lead 404 to an audio reproducing circuit 406. The reproducing circuit 406 includes an amplifier, a demodulator, etc. The output 408 of the reproducing circuit 406 is connected via a contact 410 to an input 414 of a shift register 412. While the contact 410 is shown in the drawing as a mechanical transfer contact, it will be advantageous to employ a gate electronics which selectively connects the input 414 of the shift register 412 to the output 408 of the reproducing circuit 406 and the output of the shift register 412. This switchover is controlled by the sync control 312 as symbolically indicated by a phantom line 418.

The shift register 412 temporarily stores an audio signal of a predetermined duration in response to a 6 MHz write clock which is fed thereto from the sync control 312. When the shift register 412 is supplied with a 128 kHz read clock from the sync control 312 on a lead 422, it will sequentially deliver the stored audio signal from its output 416 while feeding it back to the input 414 over a feedback line 420. Preferably, the shift register 412 may comprise the DRAM previously mentioned. A required storage capacity is 512K bits for an audio signal which lasts four seconds and 1 M bits for an audio signal which lasts eight seconds.

The output 416 of the shift register 412 is also connected to a D/A converter 424 by a line 416. The D/A converter 424 is adapted to perform nonlinear D/A conversion in response to the audio signal or digitized eight-bit word on the line 416, delivering an analog waveform from its output 426 to a loudspeaker 430 via an amplifier 428.

The sync control 312 serves to supply the various circuits with necessary sync signals to control their operations. Upon actuation of a reproduce switch (not shown), a signal PY is energized so that the sync control 312 supplies pulses to the motor 302 over a control line 314 to drive the motor 302 and, therefore, the disc 116 at the constant speed of 3,600 rpm. In response to a signal FN indicative of a field number or track number associated with a desired picture fed to the sync control 312, the tracking mechanism 310 is controlled by the sync control 312 to move the heads 308 and 402 respectively to a position of the disc 116 above the video track and audio track which are specified by the signal FN.

The video read head 308 reads the video signal out of the specific video track to supply it to the reproducing circuit 316. Because one track has accommodated one field of video signal, the reproducing circuit 316 is repeatedly and continuously supplied with the one field video signal at the rate of 60 fields per second during the rotation of the disc 116. As a result, the display 322 displays a still picture of the one field.

Meanwhile, the audio read head 402 reads the audio signal out of the audio track on the disc 116 which is specified by the signal FN. The audio signal is transferred to the shift register 412 via the reproducing circuit 406. The contact 410 in this situation remains in a logical state which connects the output 408 of the reproducing circuit 406 to the input 414 of the shift register 412. Clocked with the write clock fed from the sync control 312 on the line 422, the shift register 412 sequentially stores the audio signal which is supplied to the input 414. In this embodiment, the frequency of the write clock is 6 MHz so that the audio signal in one whole audio track is stored in the shift register 412 within 1/60 second.

As leading one of the successive audio signals reaches the stage of the shift register 412 which is closest to the output 416, the sync control 312 detects this via the line 422 to switch over the contact 410 such that the output 416 of the shift register 412 becomes connected to the input 414. The shift register 412 progressively steps in response to the read clock supplied by the sync control 312, sequentially delivering the audio signals stored therein. Each audio signal output from the shift register 412 is fed to the D/A converter 424 and, at the same time, fed back to the input 414 via the loop 420 to recirculate through the shift register 412. The read clock in this embodiment has a frequency of 128 kHz and causes a 512K bit audio signal to be fed from the shift register 412 serially to the D/A converter 424. The D/A converter 424 transforms the input audio signal into an analog waveform to deliver it from the output 426 to the loudspeaker 430 via the amplifier 428. Thus, the analog signal is transduced by the loudspeaker 430 into audible sound. It will be recalled that in this embodiment audio signals can be recorded on the audio tracks of the disc 116 over a selected period of time starting from the instant four seconds before a shot. Hence, the sound coming out through the loudspeaker 430 in association with the still picture is the sound which was generated over the selected time period starting from the instant four seconds before the shot.

The shift register 412 is capable of storing and circulating an audio signal whose length corresponds to the number of stages of the shift register 412. For example, the shift register 412 for storing an eight-second audio signal has stages which correspond to 1 M bits. When the reproduce switch is deactuated or a sound stop switch (not shown) is operated, the signal PY becomes deenergized so that the sync control 312 disables the shift register 412 and D/A converter 424. Otherwise, the data in the shift register 412 continuously circulates through the loop 420 with the result that the audio signal stored in the shift register 412 is repeatedly reproduced by the loudspeaker 430.

Suppose that a series of tracks on the disc 116 have stored an audio signal whose length is larger than the capacity of the shift register 412 (e.g. a capacity for accommodating an audio signal whose duration is eight seconds). Then, the control 312 performs the previously described operation to load the shift register 412 with the audio signal in the first sound track to reproduce it through the loudspeaker 430. Next, the read head 402 is shifted to the next audio track and, immediately after the preceding audio track has been read out the audio signal in the new track is loaded in the shift register 412 to be sequentially reproduced through the loudspeaker 430. In this manner, all the audio signals stored in the tracks are reproduced intermittently. Here, it is needless to circulate the data through the shift register 412 via the loop 420.

The reproducing circuitry shown in FIG. 2 is also advantageous to reproduce by the display 322 or the recorder 324 a plurality of fields of pictures which were shot in the consecutive shoot mode. For example, where sound associated with the initial field is recorded on the disc 116, it may be reproduced by the loudspeaker 430 while being loaded in and circulated through the shift register 412 or being sequentially loaded in the shift register 412 out of a series of sound tracks.

The embodiment shown in FIG. 2 is constructed so that the disc 116 rotates at a speed appropriate for the reproduction of still pictures, i.e., 3,600 rpm, and an audio signal is stored in the shift register 412. Alternatively, the disc 116 may be driven at a relatively low speed suitable for the reproduction of sound and the shift register 412 may be replaced by a temporary storage means which is installed in the video section 300 to store a video signal.

In summary, it will be seen that the present invention provides a sound recording system for an electronic still camera which is successfull to record sound generated before a shot in correspondence with the image field of the shot. More specifically, sound can be recorded over a desired period of time starting from the instant which is precedent to the depression of a release button by a given period of time. One can reproduce the picture while listening to the sound associated therewith. Furthermore, one can reproduce the sound repeatedly for any desired period of time.

Various modifications will become possible for those skkilled in the art after receiving the teachings of the present disclosure without departing from the scope thereof.

What I claim is:

1. A sound recording method for an electronic still camera which shoots a scene to record video signals indicative of still images of the scene time-serially on a recording medium, comprising the steps of:

constantly delaying sequentially input, time-serial audio signals by a predetermined period of time; and sequentially recording the delayed audio signals on the recording medium in response to the shooting, whereby sound is recorded on the recording medium starting from an instant which is precedent to the instant of the shooting by the predetermined period of time.

2. A sound recording method in accordance with claim 1, in which the recording medium comprises a magnetic disc, on which the audio signals are magnetically recorded together with the video signals associated with the audio signals.

3. A sound recording apparatus for an electronic still camera which shoots a scene to record video signals indicative of still images of the scene time-serially on a recording medium, comprising:
   a delay circuit for delaying input audio signals by a predetermined period of time;
   sound recording means for recording an output of the delay circuit on the recording medium; and
   a control circuit for supplying the sound recording means with an output of the delay circuit in response to the shooting, whereby sound is recorded on the recording medium starting from an instant which is precedent to the instant of the shooting by the predetermined period of time.

4. A sound recording apparatus in accordance with claim 3, in which the recording medium comprises a magnetic disc, the sound recording means comprising a magnetic record head and head moving means for locating said record head on a desired sound track of the magnetic disc, the control circuit controlling said head moving means to record an audio signal on a sound track which is associated with a video signal.

5. A sound recording apparatus in accordance with claim 3, in which the delay circuit comprises an analog-to-digital converter for converting the input audio signal into a digital signal, and a FIFO circuit connected to an output of the analog-to-digital converter, said FIFO circuit having a storage capacity large enough to store a digitized audio signal whose length corresponds to the predetermined period of time, whereby the digital signals sequentially supplied to the delay circuit from the analog-to-digital converter are delayed by the predetermined period of time to sequentially be delivered to the sound recording means.

6. A sound recording apparatus in accordance with claim 4, in which the delay circuit comprises an analog-to-digital converter for converting the input audio signal into a digital signal, and a FIFO circuit connected to an output of the analog-to-digital converter, said FIFO circuit having a storage capacity large enough to store a digitized audio signal whose length corresponds to the predetermined period of time, whereby the digital signals sequentially supplied to the delay circuit from the analog-to-digital converter are delayed by the predetermined period of time to sequentially be delivered to the sound recording means.

7. A sound recording apparatus in accordance with claim 3, in which when video signals are to be recorded continuously at a time, the control circuit responds only to the first one of the consecutive shootings by operating to record the audio signal.

8. A sound recording apparatus in accordance with claim 3, in which when video signals are to be recorded with one superposed upon another, the control circuit responds only to the first one of the superposed shootings by operating to record the audio signal.

9. A sound recording apparatus in accordance with claim 4, in which when video signals are to be recorded continuously at a time, the control circuit responds only to the first one of the consecutive shootings by operating to record the audio signal.

10. A sound recording apparatus in accordance with claim 4, in which when video signals are to be recorded with one superposed upon another, the control circuit responds only to the first one of the superposed shootings by operating to record the audio signal.

11. A sound reproducing apparatus for an electronic still camera for reproducing, together with a video signal indicative of a still image, an audio signal which is recorded on a rotary recording medium in association with the video signal, comprising:
   drive means for driving the rotary recording medium at a predetermined rotation speed which is appropriate for the reproduction of the still image;
   reading means for reading out of the rotary recording medium an audio signal associated with a video signal which is reproduced from the recording medium;
   storage means for temporarily storing a unit recording amount of the audio signal read out from the recording medium by the reading means;
   reproducing means for reproducing as audible sound the audio signal output from the storage means; and
   a control circuit for causing an audio signal to be read out of the storage means at a rate appropriate for audio signal reproduction in response to the audio signal being stored in the storage means, whereby sound associated with a still image which is in reproduction is reproduced from the reproducing means.

12. A sound reproducing apparatus in accordance with claim 11, in which the recording medium comprises a magnetic disc, the reading means comprising a magnetic sound reproducing head, and track selector means for causing said sound reproducing head to trace a desired audio track on the magnetic disc.

13. A sound reproducing apparatus in accordance with claim 11, in which the audio signal recorded on the recording means is in the form of a digital signal, the storage means comprising a FIFO circuit for storing the digital signal, the reproducing means comprising a digital-to-analog converter for converting an output of the FIFO circuit into an analog signal.

14. A sound reproducing apparatus in accordance with claim 12, in which the audio signal recorded on the recording means is in the form of a digital signal, the storage means comprising a FIFO circuit for storing the digital signal, the reproducing means comprising a digital-to-analog converter for converting an output of the FIFO circuit into an analog signal.

15. A sound reproducing apparatus in accordance with claim 13, in which the storage means comprises a recirculation circuit for causing the output of the FIFO circuit to sequentially recirculate to an input thereof, the control circuit recirculating the audio signal through said recirculation circuit while reading the audio signal out of the FIFO circuit.

16. A sound reproducing apparatus in accordance with claim 14, in which the storage means comprises a recirculation circuit for causing the output of the FIFO circuit to sequentially recirculate to an input thereof, the control circuit recirculating the audio signal through said recirculation circuit while reading the audio signal out of the FIFO circuit.

* * * * *